Aug. 16, 1927.
E. O. WHEELOCK
GAUGE
Filed May 15, 1925
1,639,321
5 Sheets-Sheet 1
Fig.1.
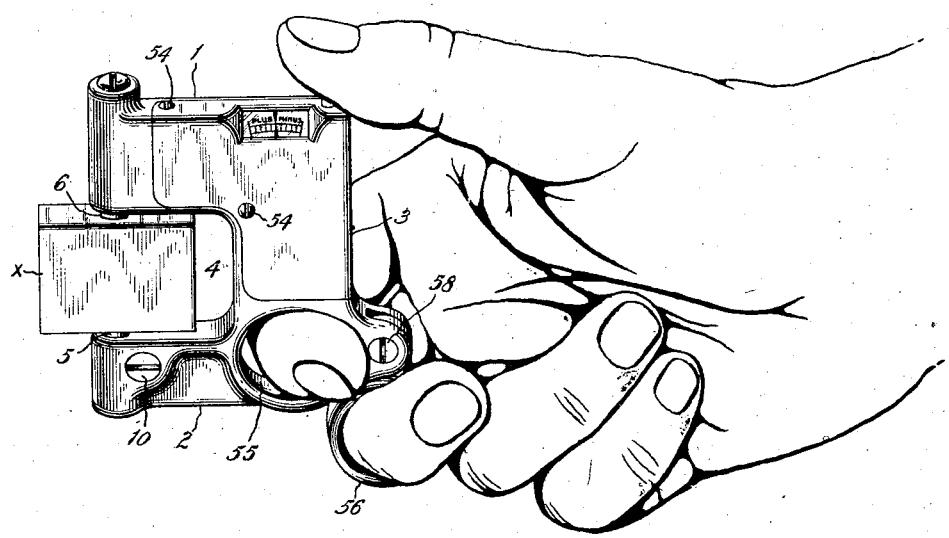
Fig.2.
Fig.3.
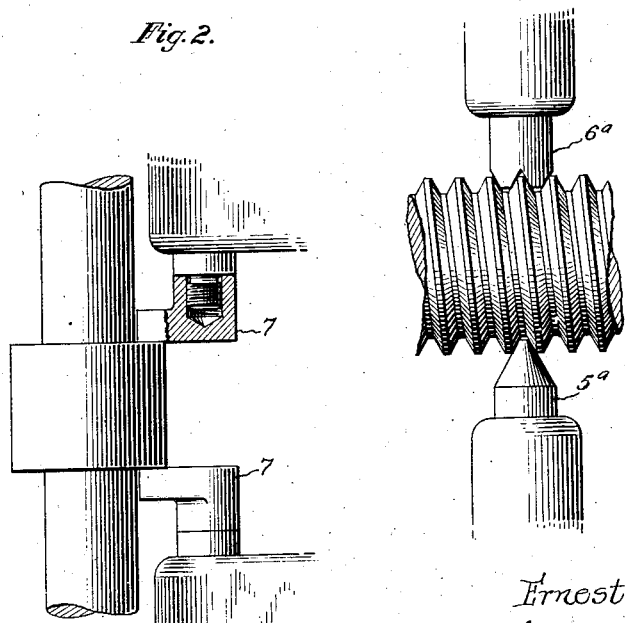
Inventor:
Ernest O. Wheelock,
By Churchill Parker Nailson
Attys.

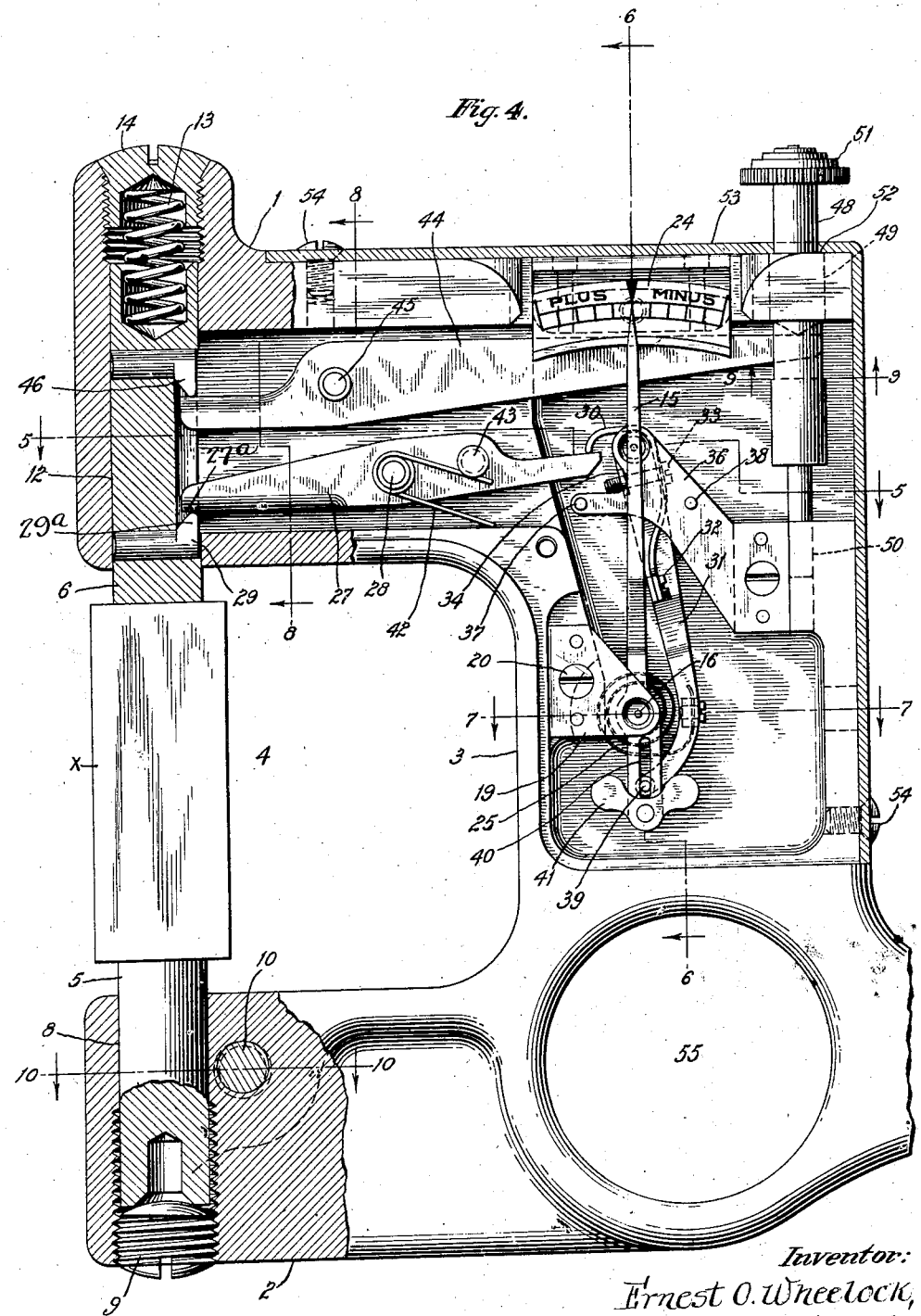

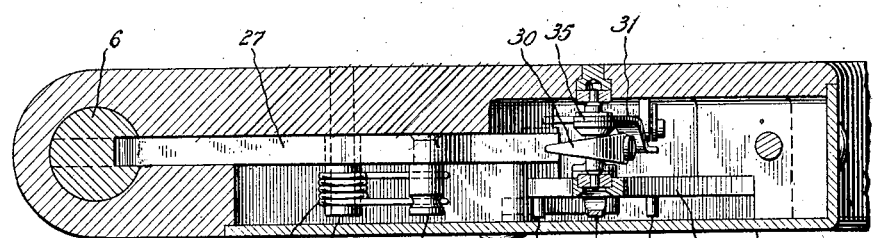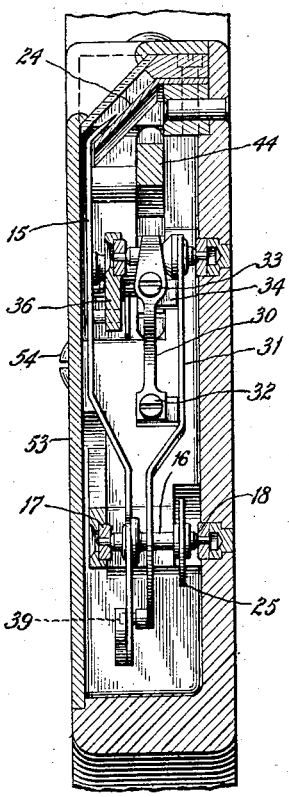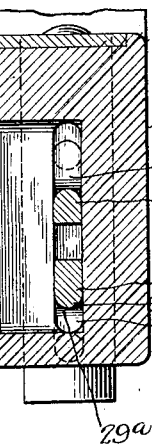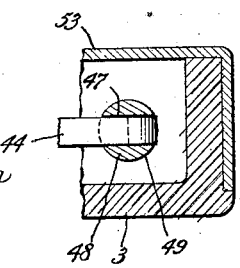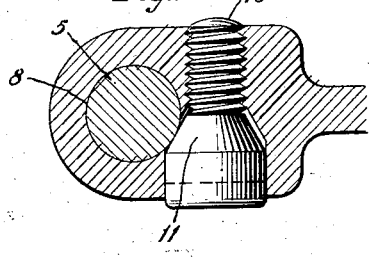

Aug. 16, 1927.  
E. O. WHEELOCK  
GAUGE  
Filed May 15, 1925
1,639,321
5 Sheets-Sheet 4
Fig.11.
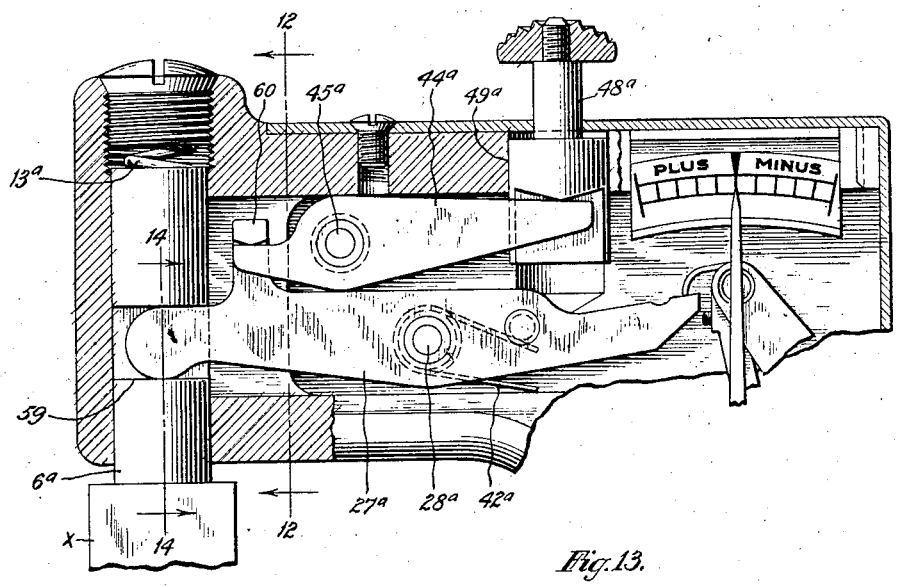
Fig.12.
Fig.13.
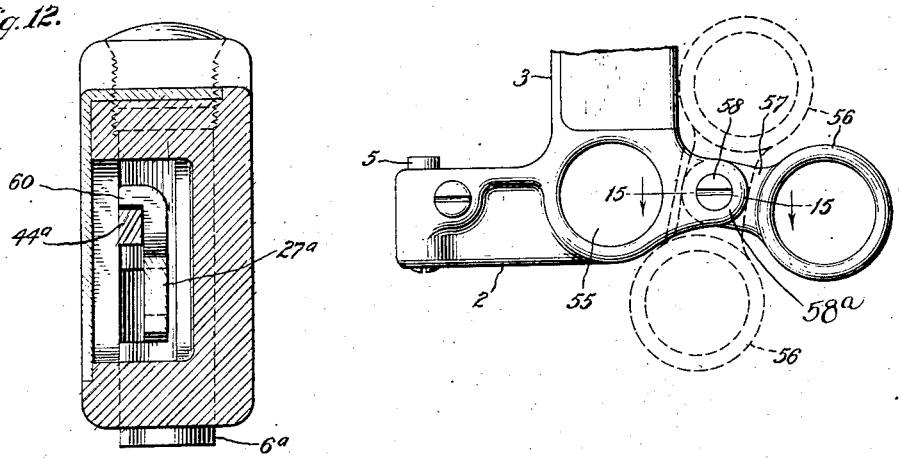
Fig.14.
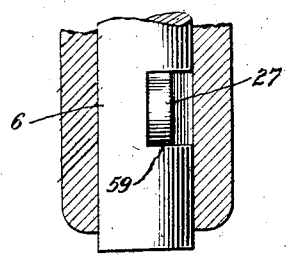
Fig.15.
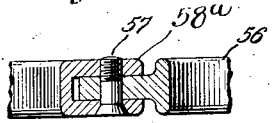
Inventor:
Ernest O. Wheelock,
By Christall Parker Carlson
Attys.

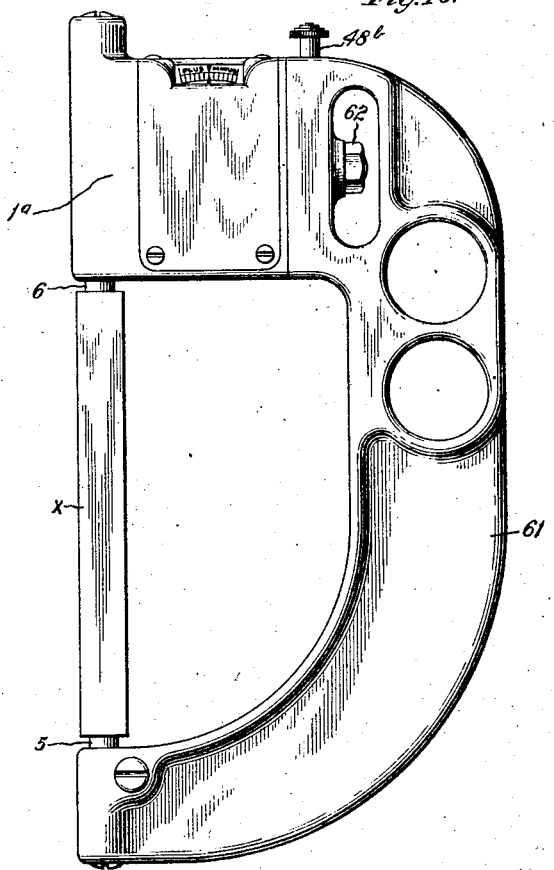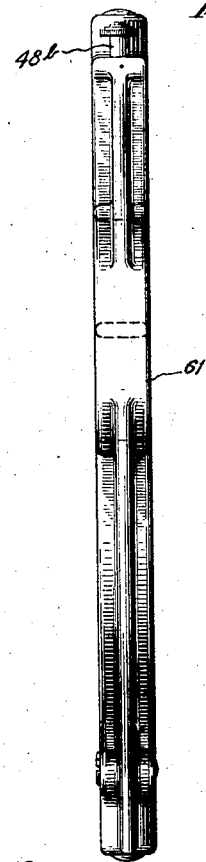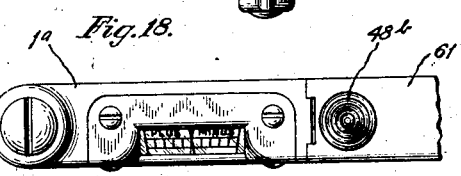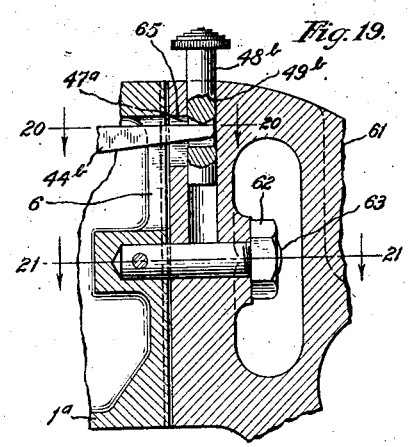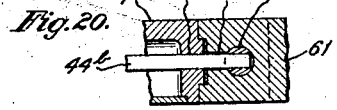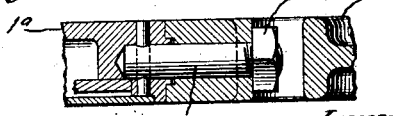

Patented Aug. 16, 1927.

1,639,321

UNITED STATES PATENT OFFICE.

ERNEST O. WHEELOCK, OF ROCKFORD, ILLINOIS.

GAUGE.

Application filed May 15, 1925. Serial No. 30,426.

This invention relates particularly to indicating mechanism adapted to be applied to or embodied in snap gauges, limit gauges, and the like.

Generally stated, the object of the invention is to produce a relatively small, compact indicating mechanism which may be applied to various types of measuring instruments, which shall give accurate results on fine measurements, which shall not be liable to injury through relatively great movement in either direction of the movable contact point, which shall be sufficiently rugged so as to withstand rough usage, and which may be constructed so as to operate accurately without excessive precision in manufacture.

In the accompanying drawings, Figure 1 is a perspective view illustrating one embodiment of the present invention, a standard gauge block being shown in position between the contact points.

Figs. 2 and 3 are fragmental views showing alternative constructions of the contact points.

Fig. 4 is a fragmental sectional view illustrating the indicating mechanism.

Figs. 5, 6, 7, 8, 9 and 10 are sectional views taken, respectively, in the planes indicated by lines 5—5, 6—6, 7—7, 8—8, 9—9 and 10—10 of Fig. 4.

Fig. 11 is a fragmental sectional view of an alternative construction of the indicating mechanism.

Fig. 12 is a section on line 12—12 of Fig. 11.

Fig. 13 is a fragmental view showing the means whereby the implement may be conveniently held by the operator.

Fig. 14 is a section on line 14—14 of Fig. 11.

Fig. 15 is a section on line 15—15 of Fig. 13.

Fig. 16 is a side view illustrating an alternative construction.

Fig. 17 is a rear view of the implement shown in Fig. 16.

Fig. 18 is a fragmental top plan view of the implement shown in Figs. 16 and 17.

Fig. 19 is a fragmental sectional view of parts shown in Fig. 16.

Fig. 20 is a section on line 20—20 of Fig. 19.

Fig. 21 is a section on line 21—21 of Fig. 19.

The body or framework of the gauge may be of various shapes and constructed in any preferred manner. In the form shown in Figs. 1 and 4 the frame is substantially U-shaped and comprises what may be termed the upper arm 1, the lower arm 2 and the connecting arm 3. The space between the arms 1 and 2 constitutes a throatway 4 to receive a gauge block $x$ or an article to be gauged. Two contacts 5 and 6 project into the throatway, the contact 5 being fixed to the arm 2, and the contact 6 being slidably mounted in the arm 1 in alinement with the contact 5. The adjacent ends of the contacts 5 and 6 may be of any form suited to the work in hand. In Figs. 1 and 4 the contacts are shown as having flat ends. In Fig. 2 they are shown as provided with angular points 7, adapted to engage opposite sides of a collar to be gauged on a rod or spindle, while in Fig. 3 the contacts are shown as shaped for engagement with a screw.

The contact 5 may be stationarily secured to the arm 2 in any preferred manner. Herein it is shown as mounted in an opening 8 and bearing against a plug 9 screwed into the lower end of said opening. The contact 5 is rigidly secured in the opening 8 by means of a screw 10 (Fig. 10) having a beveled shoulder 11 arranged to bear against the contact.

The contact 6 is in the form of a plunger slidably mounted in an opening 12 formed in the arm 1 in alinement with the opening 8. The plunger 6 is pressed toward the fixed contact 5 by means of an expansive coiled spring 13 interposed between the upper end of the contact plunger and a screw 14 seated in the upper end of the opening 12. The strength of this spring may be varied to suit different conditions of work.

In the embodiments herein shown of the invention, the indicating mechanism is located within the U-shaped framework or gauge and more specifically within a chamber or recess found in the arms 1 and 3. The indicating mechanism includes a pointer 15 (Figs. 4 and 6) fixed upon an arbor 16. The arbor is pivotally supported in bearing blocks 17 and 18 (Fig. 6). The bearing block 17 fits tightly within a recess in a bracket 19, which is secured to the framework of the gauge by means of a screw 20. An opening 21 (Fig. 7) is formed in the bracket 19 so that the bearing block 17 may be driven out of its seat when it is necessary to replace the bearing. The bearing block 18 fits tightly within an opening 22 in the arm 3. The opening 22 extends through the arm and contains a block 23 against which pressure may be exerted to drive the bearing block 18 out of opening 22 when replacement is required.

The free end of the pointer 15 overlies a dial 24 which is arranged at an angle of approximately 45° with reference to the sides of the gauge framework, the dial being thus positioned so that it may be conveniently read in any position of the gauge.

A hair spring 25 connected at one end to the arbor 16 and anchored at its other end to the arm 3 at 26 tends to swing the pointer 15 to the plus side of the zero mark on the dial 24. The means for swinging the pointer in the opposite direction is arranged to be actuated by the contact plunger 6 by means to be now described. A contact lever 27 is pivoted on the arm 1 at 28. One arm of the lever 27 has a rounded surface 27ª (Fig. 8) which lies in contact with the rounded, relatively thin edge 29 of a hardened bearing piece 29 carried by the contact plunger 6. The other arm of the lever 27 underlies the free end of a curved relatively stiff leaf spring 30 adjustably secured to an indicator lever 31. In the construction herein shown one end of the leaf spring 30 is anchored to the lever 31 at 32. An adjusting screw 33 extends through the leaf spring 30 about midway its ends and is tapped into an angular lug 34 on the indicator lever 31 whereby the position of the free end of the leaf spring 30 may be accurately adjusted. It will be seen that the lever 31 and the free end of the spring 30 constitute a bell-crank lever, the lever arm 31 being much longer than the arm 30, whereby a relatively great movement of the pointer is produced by a small movement of the arm 30.

The indicator lever 31 is rigidly secured to an arbor 35 which is supported in bearings substantially like those for the arbor 16. One of the bearings for the arbor 35 is carried by a bracket 36. Pins 37 and 38 set within the bracket 36 serve to limit the swinging movements of the pointer 15.

On the lower end of the indicator lever 31 is a pin 39 which lies within a longitudinal slot 40 formed in the lower arm of the pointer 15. 41 is a counter-weight secured to said pointer arm.

In order to swing the pointer 15 toward or across the minus side of the dial and to prevent backlash of the lever 27, I provide a torsion spring 42 coiled about the pivot of said lever and bearing at one end against the framework of the gauge and at its other end against a stud 43 on the lever 27. If desired, the spring 42 may be sufficiently strong so as to render the use of spring 13 unnecessary, particularly when a very light pressure will suffice.

Referring to Fig. 4: It will be seen that upward movement of the contact plunger 6 will cause the inner end of the contact lever 27 to move downwardly, the leaf spring 30 following said lever arm under the action of the hair spring 25 exerted through the pointer arm 40, pin 39 and indicator lever 31, the pointer swinging to the plus side of the dial. If upward movement of the contact plunger be continued far enough the pointer 15 will stop against the pin 37, after which continued upward movement of the lever 27 will cause said lever to leave the leaf spring 30. Downward movement of the plunger 6 will cause the pointer to swing to the minus side of the dial under the action of the spring 42, the spring 30 yielding if the plunger movement continues after the pointer stops against the pin 38.

The means for manually operating the contact plunger 6 comprises a lever 44 mounted between its ends upon a pivot 45 set in the arm 1. One arm of the lever 44 engages a hardened bearing point 46 carried by the contact plunger 6. The other arm of the lever 44 extends through a slot 47 (Fig. 9) formed in a plunger 48 which is slidably mounted in openings 49 and 50 in the gauge framework.

On the upper end of the plunger 48 is a thumb piece 51 (Fig. 4). Downward movement of the contact plunger 6 under the action of the expansion spring 13 is limited by contact of an annular shoulder 52 on the plunger 48 with the inner side of the cover plate 53 which encloses the indicator mechanism. The cover plate 53 is secured in place by means of screws 54.

Means is provided whereby the gauge may be conveniently and securely held in the hand. Herein is shown a finger hole 55 (Fig. 13) formed in the lower corner of the gauge framework and a ring 56 having a stem 57 which is pivoted at 58 to a bifurcated lug 58ª on the gauge framework. As indicated in Fig. 13 the ring 56 may be swung into the position most convenient for the operator, or to permit the gauge to be placed in a case. It will be apparent that when the fingers are inserted in the rings 55 and 56 and the thumb placed upon the thumb piece 51 the gauge may be securely held, even though the operator's hand be wet or oily.

If desired, a heat-insulated or other suitable handle may be substituted for the ring 56, such handle being attached by means of the lug 58ª; or said lug may be used to connect the gauge to a supporting bracket or stand of any preferred character.

Upon reference to Fig. 4 it will be seen that inasmuch as the contact lever 27 moves away from the indicator lever arm 30 when the contact plunger 6 is being raised, said plunger may be raised as far as may be necessary in reaching over projections or over a wall surrounding a recess, thereby permitting a relatively great range of movement without interfering with or stressing the indicating lever 31 and the pointer 15. Since the indicator lever arm 30 is yieldable, the contact plunger 6 may move in either direction after the pointer 15 has ceased to register without injury to the indicating mechanism.

The provision of the leaf spring 30 with its adjusting screw 33 permits of adjustment in assembling the parts so that exact thousandths or fractional parts of a thousandths can be registered on the dial, and thus obviates the necessity for the precision in manufacture which would be required if the bell crank 30, 31 were rigid.

In Fig. 11 I have shown an alternative construction wherein the contact lever 27$^a$ and the operating lever 44$^a$ are engaged with each other, thus obviating the necessity of connecting more than one of said levers to the contact plunger 6$^a$. The contact lever 27$^a$ is pivoted at 28$^a$ and is provided with a torsion spring 42$^a$. One end of the contact lever 27$^a$ is suitably shaped to lie within a transverse notch 59 in the contact plunger 6$^a$. On the contact lever 27$^a$ is an angular lug 60 that overlies one end of the lever 44$^a$. The latter is pivoted at 45$^a$. The plunger 48$^a$ is slidably mounted in an opening 49$^a$ in the gauge framework and is arranged to bear against one end of the lever 44$^a$. Downward movement of the contact plunger 6$^a$ under the action of the expansion spring 13$^a$ is limited by contact of the lever 44$^a$ with the adjacent wall of the recess in which it is mounted.

The form of indicating mechanism disclosed in Figs. 1 and 14 is very compact and may be made relatively small without sacrificing the strength and ruggedness essential in a mechanism which is liable to receive rough usage. Because of these characteristics the mechanism herein shown lends itself readily to embodiment in gauges of various forms. In Fig. 16, for example, I have shown a snap gauge having a two part body or frame which consists of an arm 1$^a$ and an arm 61 which is detachably secured to the arm 1$^a$ by means of a nut 62 and screw stud 63 (Fig. 19). The frame part 1$^a$ carries a contact plunger 6, while the frame part 61 carries an adjustable contact 5. Indicating mechanism substantially similar to that shown in Fig. 4 may be enclosed within a recess formed in the arm 1$^a$. The lever 44$^b$ (Fig. 19) extends through a slot 64 (Fig. 20) and through a slot 65 formed in the arm 61. The arm 61 carries an operating plunger 48$^b$ which is slidably mounted in an opening 49$^b$ in the arm 61.

As shown in Fig. 19 the end of the operating lever 44$^b$ lies within an opening 47$^a$ in the operating plunger 48$^b$.

It will be obvious that the part 1$^a$ carrying the indicating mechanism may be secured to arms 61 made in various shapes and sizes so as to provide throatways suitable for work of various dimensions and forms.

In setting the pointer 15 to zero, a standard size block $x$, or the part which it is desired to duplicate, is placed between the contacts 5 and 6, and the contact 5 is adjusted up or down by means of the screw 9 until the pointer 15 is at the zero mark, whereupon the contact 5 is locked in adjusted position by means of the clamping screw 10. By referring occasionally to the standard size block or part used in setting up the gauge, variations caused by temperature in handling can be detected and allowance made accordingly.

The indicating mechanism is of simple, sturdy construction and will retain its accuracy under the most severe usage. There are no gears, racks, worms or complicated system of levers to create friction and wear or get out of order. The bell crank lever 30, 31 and the pointer 15 are the only parts which require mounting in carefully fitted bearings, and by adopting the form of bearings herein shown there will be practically no friction or wear to contend with.

I claim as my invention:

1. A gauge having, in combination, a chambered U-shape gauge body comprising an upper arm, a lower arm and a connecting arm, a contact on the lower arm, a dial carried by the upper arm, a pointer pivoted within the connecting arm, a spring connected to the pointer and tending to move the latter across the dial, a bell crank lever pivoted within the gauge body and having one arm connected with the pointer, a contact lever pivoted within the upper arm, and engaging the other arm of the bell crank lever, a spring acting upon the contact lever and tending to move the latter in the direction to swing the pointer in opposition to the first-mentioned spring, a contact plunger slidably mounted in the upper arm opposite to said contact, one arm of the contact lever engaging said plunger, a spring acting upon the contact plunger to press the latter against a part to be gauged, an operating lever pivoted within the upper arm, one arm of said lever engaging the contact plunger, and a digitally actuated plunger carried by the gauge body and engaging the other arm of the operating lever.

2. A gauge having, in combination, a chambered U-shape gauge body, a dial carried by said body, a pointer pivoted within the body, a spring connected to the pointer and tending to move the latter across the dial, a bell crank lever pivoted within the gauge body and having a pin-and-slot connection with the pointer, a contact lever pivoted within the gauge body and engaging one arm of the bell crank lever, a spring acting upon the contact lever and tending to move the latter in the direction to swing the pointer in opposition to the first-mentioned spring, a contact plunger slidably mounted in the gauge body, a contact supported by the gauge body opposite to said contact plunger, one arm of the contact lever engaging said plunger, a spring acting upon the contact plunger to press the latter against a part to be gauged, an operating lever pivoted within the gauge body, one arm of said operating lever engaging the contact plunger, and a digitally-actuated plunger carried by the gauge body and engaging the other arm of the operating lever.

3. A gauge having, in combination, a chambered U-shape gauge body, a dial carried by said body, a pointer pivoted within the body, a spring connected to the pointer and tending to move the latter across the dial, a bell crank lever pivoted within the gauge body and connected with the pointer, a contact lever pivoted within the gauge body and engaging one arm of the bell crank lever, a contact plunger slidably mounted in the gauge body, a contact supported by the gauge body opposite to said contact plunger, one arm of the contact lever engaging said plunger, a spring acting upon the contact plunger to press the latter against a part to be gauged, an operating lever pivoted within the gauge body, one arm of said operating lever engaging the contact plunger, and a digitally-actuated plunger carried by the gauge body and engaging the other arm of the operating lever.

4. A gauge having, in combination, a chambered U-shape gauge body, a dial carried by said body, a pointer pivoted within the body, a spring connected to the pointer and tending to move the latter across the dial, a bell crank lever pivoted within the gauge body and connected with the pointer, a contact lever pivoted within the gauge body and engaging one arm of the bell crank lever, a contact plunger slidably mounted in the gauge body, a contact supported by the gauge body opposite to said contact plunger, one arm of the contact lever engaging said plunger, a spring acting upon the contact plunger to press the latter against a part to be gauged, and an operating lever for moving the contact plunger in opposition to the spring.

5. A gauge having, in combination, a chambered U-shape gauge body, a dial carried by said body, a pointer pivoted within the body, a spring connected to the pointer and tending to move the latter across the dial, a bell crank lever pivoted within the gauge body and having one arm connected with the pointer, a contact lever pivoted within the gauge body and engaging the other arm of the bell crank lever, a contact plunger slidably mounted in the gauge body, a contact supported by the gauge body opposite to said contact plunger, a spring acting upon the contact plunger to press the latter against a part to be gauged, an operating lever pivoted within the gauge body, the contact lever and the operating lever being arranged to be moved by the contact plunger, and a digitally-actuated plunger carried by the gauge body and engaging the operating lever.

6. An indicating gauge having, in combination, a body, a dial carried by the body, a pointer pivotally supported by the body, a relatively light spring connected to the pointer and tending to move the latter across the dial in a certain direction, a bell crank lever pivotally supported by the body, one arm of which lever is much longer than the other, the long arm of said bell crank lever having a pin-and-slot connection with the pointer and the short arm being somewhat yieldable, a contact member movably supported by the body, a contact supported by the body opposite to said contact member, a relatively strong spring to press said contact member against a part to be gauged, said contact member having a separable connection with and being arranged to exert pressure against the short bell crank arm and thus swing the bell crank lever and the pointer in opposition to the first-mentioned spring, and means to limit pivotal movement of the pointer in either direction, the short bell crank arm yielding when the pointer engages one of said limiting means, and the connection between the contact member and the short bell crank arm separating when the pointer engages the other limiting means.

7. An indicating gauge having, in combination, a body, a dial carried by the body, a pointer pivotally supported by the body, a relatively light spring connected to the pointer and tending to move the latter across the dial in a certain direction, a bell crank lever pivotally supported by the body, one arm of which lever is much longer than the other, the long arm of said bell crank lever being connected with the pointer and the short arm being somewhat yieldable, a contact member movably supported by the body, a contact supported by the body opposite to said contact member, and means including a relatively strong spring to press said contact member against a part to be gauged, said means being arranged to exert pressure against the short bell crank arm and thus swing the bell crank lever and the pointer in the other direction in opposition to the first-mentioned spring, and means to limit pivotal movement of the pointer in the last-mentioned direction, the short bell crank arm yielding when the pointer engages said limiting means.

8. An indicating gauge having, in combination, a body, a dial carried by the body, a pointer pivotally supported by the body, a relatively light spring connected to the pointer and tending to move the latter across the dial in a certain direction, a bell crank lever pivotally supported by the body, one arm of which lever is much longer than the other, the long arm of said bell crank lever being connected with the pointer, a contact member movably supported by the body, a contact supported by the body opposite to said contact member, and a relatively strong spring to press said contact member against a part to be gauged, said contact member having a separable connection with the short bell crank arm to swing the bell crank lever and the pointer in the other direction in opposition to the first-mentioned spring, and means to limit pivotal movement of the pointer in the first mentioned direction, the connection between the contact member and the short bell crank arm separating when the pointer engages said limiting means.

9. An indicating gauge for use in determining dimensions of parts comprising, in combination, a dial, a pointer pivoted to swing across the dial, a spring operatively connected to the pointer and tending to swing said pointer in a certain direction, a bell crank lever, one arm of which has a pin-and-slot connection with said pointer, a contact lever arranged to engage the other arm of the bell crank lever, a spring tending to move the contact lever in the direction to move the pointer in opposition to the first-mentioned spring, means for manually swinging the contact lever in the opposite direction, a contact movable with the contact lever, and a cooperating contact opposite the first mentioned contact.

10. An indicating gauge for use in determining dimensions of parts comprising, in combination, a dial, a pointer pivoted to swing across the dial, a spring operatively connected to the pointer and tending to swing said pointer in a certain direction, a bell crank lever, one arm of which is connected with said pointer, a contact lever arranged to bear against the other arm of the bell crank lever, a spring tending to move the contact lever in the direction to press against said bell crank lever arm and thus move the pointer in opposition to the first-mentioned spring, means for manually swinging the contact lever in the opposite direction to withdraw the contact lever from said bell crank lever arm, a contact movable with the contact lever, and a cooperating contact opposite the first mentioned contact.

11. A snap gauge having a U-shape gauge body, said body having an opening to receive a finger, a finger ring having a stem pivoted to said body adjacent to said opening, a thumb-operable plunger mounted on the gauge body in a position to be actuated by the thumb when two fingers of the same hand are inserted in said opening and said finger ring, a contact movable by said plunger, and a cooperating contact opposite the first mentioned contact.

12. An indicating gauge for use in determining dimensions of parts comprising, in combination, a dial, a pointer pivoted to swing across the dial, a spring operatively connected to the pointer and tending to swing said pointer in a certain direction, a bell crank lever, one arm of which is connected with said pointer, a contact lever arranged to bear against the other arm of the bell crank lever, said other arm being adjustable with relation to the first mentioned arm, a spring tending to move the contact lever in the direction to press against said bell crank lever arm and thus move the pointer in opposition to the first-mentioned spring, means for manually swinging the contact lever in the opposite direction to withdraw the contact lever from said bell crank lever arm, a contact movable with the contact lever, and a cooperating contact opposite the first mentioned contact.

In testimony whereof, I have hereunto affixed my signature.

ERNEST O. WHEELOCK.